(12) United States Patent
Kalbe et al.

(10) Patent No.: US 9,359,518 B2
(45) Date of Patent: Jun. 7, 2016

(54) AQUEOUS BINDER FOR GRANULAR AND/OR FIBROUS SUBSTRATES

(71) Applicants: Michael Kalbe, Weinheim (DE); Holger Schilling, Birkenau (DE); Kathrin Michl, Ludwigshafen (DE); Andreas Pfau, Ludwigshafen (DE)

(72) Inventors: Michael Kalbe, Weinheim (DE); Holger Schilling, Birkenau (DE); Kathrin Michl, Ludwigshafen (DE); Andreas Pfau, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 493 days.

(21) Appl. No.: 13/680,505

(22) Filed: Nov. 19, 2012

(65) Prior Publication Data

US 2013/0127085 A1    May 23, 2013

Related U.S. Application Data

(60) Provisional application No. 61/563,067, filed on Nov. 23, 2011, provisional application No. 61/612,988, filed on Mar. 20, 2012.

(51) Int. Cl.
| | | |
|---|---|---|
| C09D 105/00 | (2006.01) | |
| C09D 103/02 | (2006.01) | |
| B29C 70/00 | (2006.01) | |
| C09D 179/02 | (2006.01) | |

(52) U.S. Cl.
CPC ............. *C09D 105/00* (2013.01); *B29C 70/00* (2013.01); *C09D 103/02* (2013.01); *C09D 179/02* (2013.01)

(58) Field of Classification Search
None
See application file for complete search history.

(56) References Cited

U.S. PATENT DOCUMENTS

| | | | |
|---|---|---|---|
| 2,282,306 A | 5/1942 | Cross | |
| 3,203,910 A | 8/1965 | Wilson | |
| 3,332,841 A * | 7/1967 | Ainsworth | A61K 31/785 424/78.1 |
| 4,076,917 A | 2/1978 | Swift et al. | |
| 4,144,123 A | 3/1979 | Scharf et al. | |
| 4,421,602 A | 12/1983 | Brunnmueller et al. | |
| 5,143,582 A | 9/1992 | Arkens et al. | |
| 5,334,287 A | 8/1994 | Hartmann et al. | |
| 5,981,689 A | 11/1999 | Mitchell et al. | |
| 6,121,409 A | 9/2000 | Mitchell et al. | |
| 6,132,558 A | 10/2000 | Dyllick-Brenzinger et al. | |
| 6,881,492 B2 * | 4/2005 | Rao | C08J 7/04 427/299 |
| 8,883,886 B2 * | 11/2014 | Rand | C08L 79/02 264/128 |
| 2004/0082689 A1 | 4/2004 | Taylor et al. | |
| 2008/0132437 A1 * | 6/2008 | Zhang | C11D 1/667 510/102 |
| 2009/0170978 A1 | 7/2009 | Kelly | |
| 2011/0262648 A1 * | 10/2011 | Lee | C08L 79/02 427/372.2 |
| 2011/0263757 A1 * | 10/2011 | Rand | C08L 79/02 524/13 |
| 2011/0286955 A1 * | 11/2011 | Bui | A61K 8/0229 424/64 |
| 2012/0208001 A1 | 8/2012 | Michl et al. | |
| 2012/0245277 A1 | 9/2012 | Michl et al. | |
| 2012/0252936 A1 | 10/2012 | Krüger et al. | |

FOREIGN PATENT DOCUMENTS

| | | |
|---|---|---|
| DE | 2 214 450 | 10/1972 |
| DE | 31 28 478 A1 | 2/1983 |
| EP | 0 095 233 A2 | 11/1983 |
| EP | 0 216 387 A2 | 4/1987 |
| EP | 0 445 578 A2 | 9/1991 |
| EP | 0 583 086 A1 | 2/1994 |
| EP | 0 649 870 A1 | 4/1995 |
| EP | 0 651 088 A1 | 5/1995 |
| EP | 0 672 920 A1 | 9/1995 |
| EP | 0 911 361 A1 | 4/1999 |
| EP | 1 578 879 | 9/2005 |
| WO | WO 99/09100 A1 | 2/1999 |
| WO | WO 00/27893 A1 | 5/2000 |
| WO | WO 00/63295 A1 | 10/2000 |
| WO | WO 2004/061038 A1 | 7/2004 |
| WO | WO 2008/150647 A1 | 12/2008 |
| WO | WO 2010/034645 A1 | 4/2010 |

* cited by examiner

*Primary Examiner* — Joseph D Anthony

(74) *Attorney, Agent, or Firm* — Oblon, McClelland, Maier & Neustadt, L.L.P.

(57) ABSTRACT

The invention provides an aqueous binder for granular and/or fibrous substrates, said binder comprising, as active constituents, a polyamine and a saccharide compound.

17 Claims, No Drawings

AQUEOUS BINDER FOR GRANULAR AND/OR FIBROUS SUBSTRATES

The present invention provides an aqueous binder for granular and/or fibrous substrates, said binder comprising, as active constituents, a) at least one organic compound having at least two primary amino groups [polyamine A], and
b) at least one saccharide compound S,
c) the weight ratio of the at least one polyamine A to the at least one saccharide compound S being 1:99 to 80:20.

The present invention further provides a process for producing shaped articles from granular and/or fibrous substrates using the aforementioned binder, and the shaped articles produced by the process.

The consolidation of fibrous or granular substrates, more particularly in flat structures, for example fiber webs, fiberboard, chipboard or more complex, three-dimensional moldings etc., is frequently accomplished by a chemical route using a polymeric binder. To increase stability, especially wet strength and thermal stability, binders comprising formaldehyde-releasing crosslinkers are frequently used. However, this gives rise to the risk of unwanted formaldehyde emission.

For avoidance of formaldehyde emissions, there have already been proposals of numerous alternatives to the binders known to date. For instance, U.S. Pat. No. 4,076,917 discloses binders which comprise polymers containing carboxylic acid or carboxylic anhydride, and β-hydroxyalkylamides as crosslinkers. A disadvantage is the relatively complex preparation of the β-hydroxyalkylamides.

EP-A 445578 discloses panels composed of finely divided materials, for example glass fibers, in which mixtures of high molecular weight polycarboxylic acids and polyhydric alcohols, alkanolamines or polyfunctional amines function as binders.

EP-A 583086 discloses formaldehyde-free aqueous binders for production of fiber webs, especially glass fiber webs. The binders comprise a polycarboxylic acid having at least two carboxylic acid groups and in some cases also anhydride groups and a polyol. These binders require a phosphorus-containing reaction accelerator in order to achieve sufficient strengths of the glass fiber webs. It is pointed out that the presence of such a reaction accelerator can be dispensed with only when a reactive polyol is used. High-reactivity polyols specified are β-hydroxyalkylamides.

EP-A 651088 describes corresponding binders for substrates composed of cellulose fiber. These binders necessarily comprise a phosphorus-containing reaction accelerator.

EP-A 672920 describes formaldehyde-free binders, impregnating agents or coating compositions, which comprise a polymer formed to an extent of 2 to 100% by weight from an ethylenically unsaturated acid or an acid anhydride as a comonomer, and at least one polyol. The polyols are substituted triazine, triazinetrione, benzene or cyclohexyl derivatives, the polyol radicals always being in the 1,3,5 positions of the rings mentioned. In spite of a high drying temperature, these binders on glass fiber webs achieve only low wet tear strengths.

DE-A 2214450 describes a copolymer formed from 80 to 99% by weight of ethylene and 1 to 20% by weight of maleic anhydride. The copolymer is used for surface coating together with a crosslinking agent, in powder form or in dispersion in an aqueous medium. The crosslinking agent used is a polyalcohol containing amino groups. In order to bring about crosslinking, however, heating to up to 300° C. is necessary.

U.S. Pat. No. 5,143,582 discloses the production of heat-resistant nonwoven materials using a thermally curing, heat-resistant binder. The binder is free of formaldehyde and is obtained by mixing a polymer having carboxylic acid groups, carboxylic anhydride groups or carboxylic salt groups and a crosslinker. The crosslinker is a β-hydroxyalkylamide or a polymer or copolymer thereof. The polymer crosslinkable with the β-hydroxyalkylamide is, for example, formed from unsaturated mono- or dicarboxylic acids, salts of unsaturated mono- or dicarboxylic acids or unsaturated anhydrides. Self-curing polymers are obtained by copolymerizing the β-hydroxyalkylamides with monomers comprising carboxyl groups.

US-A 2004/82689 discloses formaldehyde-free aqueous binders for production of fiber webs, especially glass fiber webs, said binders consisting essentially of a polymeric polycarboxylic acid, a polyol and an imidazoline derivative. The resulting bound fiber webs are said to have reduced water absorption. There is unspecific disclosure both of nitrogen-containing and of nitrogen-free polyols, but the nitrogen-containing triethanolamine in particular is described as preferred. Specific imidazoline derivatives mentioned are reaction products of a fatty acid with aminoethylethanolamine or diethylenetriamine. The aqueous binder compositions disclosed comprise a phosphorus-containing reaction accelerator.

WO 99/09100 discloses thermally curable compositions and the use thereof as a formaldehyde-free binder for production of shaped articles, said compositions comprising, as well as an alkanolamine having at least two OH groups, a polymer 1 comprising ≤5% by weight and a further polymer 2 comprising ≥15% by weight of an α,β-ethylenically unsaturated mono- or dicarboxylic acid in polymerized form.

In addition, WO10/34645 discloses aqueous binder systems for granular and/or fibrous substrates, said binder systems comprising, as active constituents, a polymer 1 comprising ≥5.5% by weight and ≤20% by weight of an α,β-ethylenically unsaturated mono- or dicarboxylic acid in polymerized form, a polymer 2 comprising ≥40% by weight of an α,β-ethylenically unsaturated mono- or dicarboxylic acid in polymerized form, and a polyol compound having at least two hydroxyl groups.

A priority-substantiating European patent application with application number 11154347.6, which was yet to be published at the priority date of the present application, discloses aqueous binders for granular and/or fibrous substrates, said binders comprising, as well as a polymer containing carboxylic acid groups and a polyol compound, essentially a salt compound. These salt-containing binder liquors have an advantageous effect on wet tear strength and the tear strength at 180° C. of the fiber nonwovens bonded therewith.

Likewise disclosed in a priority-substantiating European patent application with application number 11159420.6, which was yet to be published at the priority date of the present application, are aqueous binders for granular and/or fibrous substrates, said binders comprising, as essential components, a polymeric polycarboxylic acid, a nitrogen-free polyol compound having at least two hydroxyl groups and a hydroxyl-free organic nitrogen compound having a $pK_B$ of ≤7.

Saccharide-containing aqueous binder compositions for granular and/or fibrous substrates proceed from the prior art which follows.

EP-A 649870 discloses mixtures of polycarboxylic acids and saccharide compounds in a weight ratio of 95:5 to 20:80 for production of polymer films with gas barrier action.

EP-A 911361 discloses aqueous binder systems for granular and/or fibrous substrates, said binder systems comprising a polycarboxyl polymer with a weight-average molecular weight of at least 1000 g/mol and a polysaccharide with a weight-average molecular weight of at least 10 000 g/mol, the amounts of which are such that the equivalents ratio of carboxyl groups to hydroxyl groups is 3:1 to 1:20.

In addition, EP-A 1578879 discloses aqueous binder compositions for coating of glass fibers, comprising a polycarboxyl polymer, a polyalcohol with at least two hydroxyl groups, and a water-soluble extender, the water-soluble extenders proposed being particularly polysaccharides with a mean molecular weight less than 10 000 g/mol.

WO 2008/150647 discloses aqueous binder systems for production of fiber mats, comprising a urea-formaldehyde resin and an aqueous copolymer dispersion, the copolymer of which is formed essentially from styrene, alkyl acrylates or methacrylates, acrylonitrile and an optionally substituted acrylamide. The aqueous copolymer dispersion may optionally also comprise starch.

US-A 2009/170978 also discloses aqueous binder systems for fiber webs, comprising an aqueous copolymer dispersion, the copolymer of which comprises between 5 and 40% by weight of at least one monomer containing carboxylic acid groups in copolymerized form, and a natural binder component selected from the group comprising polysaccharides, plant proteins, lignins and/or lignosulfonates.

A priority-substantiating European patent application with application number 11161026.7, which was yet to be published at the priority date of the present application, discloses aqueous binders for granular and/or fibrous substrates, said binders comprising, as well as a saccharide compound, also a specific polymer containing nitrile groups and carboxylic acid groups or carboxamide groups.

However, the shaped articles produced with the aforementioned compositions, especially fiber webs, are not always fully satisfactory in terms of all mechanical properties, such as tear strength, especially wet tear strength in the case of glass fiber webs, and additionally water resistance in the case of cork moldings. Furthermore, the market is increasingly demanding alternative formaldehyde-free binder systems based on renewable raw materials.

It was an object of the present invention to provide an alternative formaldehyde-free aqueous binder system based on renewable raw materials for fibrous and/or granular substrates, this binder system resulting, in the case of shaped articles, for example fiber webs, in equivalent or improved mechanical properties such as, more particularly, wet tear strength in the case of glass fiber webs and/or water resistance in the case of cork moldings.

Accordingly, the aqueous binder defined at the outset has been found.

The inventive binder comprises, as one essential constituent, at least one organic compound having at least two primary amino groups [polyamine A].

According to the invention, the polyamines A used may be all organic compounds having at least two primary amino groups. The molecular weight of the polyamines A may be in the range of ≥60 and ≤10 000 000 g/mol. It is significant that the polyamines A used may be either low molecular weight aliphatic, aromatic or heterocyclic compounds having at least two primary amino groups, or corresponding oligomeric or polymeric compounds comprising monomer units having at least two primary amino groups in polymerized form. The low molecular weight, nonpolymeric polyamines A have a molecular weight of <500 g/mol, while the oligomeric or polymeric polyamines A have a weight-average molecular weight of ≥500 g/mol. The determination of the weight-average molecular weight of the oligomeric or polymeric polyamines A is familiar to those skilled in the art and is effected in the context of this document generally by gel permeation chromatography with defined standards.

Examples of low molecular weight aliphatic, aromatic or heterocyclic polyamines A which may optionally be substituted by one or more $C_1$-$C_{10}$-alkyl groups include linear aliphatic $C_2$-$C_{10}$-amines such as 1,2-diaminoethane, 1,2-diaminopropane, 1,3-diaminopropane, 1,2,3-triaminopropane, 1,3-diamino-2-methylpropane, 1,2-diaminobutane, 1,3-diaminobutane, 1,4-diaminobutane, 1,2,3-triaminobutane, 1,2,4-triaminobutane, 1,2-diamino-3-methylbutane, 1,3-diamino-2-methylbutane, 1,5-diaminopentane, 1,3-diamino-2,2-dimethylpropane, 1,6-diaminohexane, 1,7-diaminoheptane, 1,8-diaminooctane, 1,9-diaminononane, 1,10-diaminodecane and the isomeric compounds thereof, cycloaliphatic amines such as 1,2-diaminocyclohexane, 1,3-diaminocyclohexane, 1,4-diaminocyclohexane, 2,3-diaminomethylcyclohexane, 2,4-diaminomethylcyclohexane, 2,5-diaminomethylcyclohexane, 2,6-diaminomethylcyclohexane, 3,4-diaminomethylcyclohexane, 3,5-diaminomethylcyclohexane, isophoronediamine, aromatic amines such as 1,2-diaminobenzene, 1,3-diaminobenzene, 1,4-diaminobenzene, 1,2-diamino-3-methylbenzene, 1,2-diamino-4-methylbenzene, 1,3-diamino-2-methylbenzene, 1,3-diamino-4-methylbenzene, 1,4-diamino-2-methylbenzene, 1,3,5-triaminobenzene, 4,4'-, 2,4'- and 2,2'-diaminodiphenylmethane, and examples of heterocyclic amines include 2,3-diaminopyridine, 2,4-diaminopyridine, 2,5-diaminopyridine, 2,6-diaminopyridine, 3,4-diaminopyridine, 3,5-diaminopyridine, 2,3-diaminofuran, 2,4-diaminofuran, 3,4-diaminofuran, 2,3-diaminopyrrole, 2,4-diaminopyrrole, 3,4-diaminopyrrole, 2,3-diaminothiophene, 2,4-diaminothiophene or 3,4-diaminothiophene. Of course, the low molecular weight polyamines A also include low molecular weight polyalkylenepolyamines having a molecular weight of <500 g/mol, such as diethylenetriamine, triethylenetetramine, dipropylenetriamine, tripropylenetetramine, dihexamethylenetriamine, N-3-aminopropylethylenediamine, N,N,N-tris(3-aminopropyl)amine, N,N'-bis(3-aminopropyl)ethylene-1,2-diamine or corresponding low molecular weight 1,ω-diamines based on ethylene oxide and/or propylene oxide, such as 1,5-diamino-3-oxapentane, 1,8-diamino-3,6-diazaoctane or 1,10-diamino-4,7-diazadecane.

$C_1$- to $C_{10}$-alkyl groups shall be understood in the context of this document to mean linear or branched alkyl radicals having 1 to 10 carbon atoms, for example methyl, ethyl, n-propyl, isopropyl, n-butyl, sec-butyl, isobutyl, tert-butyl, n-pentyl, isopentyl, tert-pentyl, n-hexyl, 2-ethylhexyl, n-nonyl or n-decyl.

The low molecular weight polyamines A are advantageously 1,6-diaminohexane, isophoronediamine, diethylenetriamine, dipropylenetriamine and/or N,N'-bis(3-aminopropyl)ethylene-1,2-diamine and particularly advantageously 1,6-diaminohexane, diethylenetriamine and/or N,N'-bis(3-aminopropyl)ethylene-1,2-diamine.

Suitable oligomeric or polymeric polyamines A are all organic compounds having a weight-average molecular weight of ≥500 g/mol and at least 2 primary amino groups, such as, more particularly, polyethyleneimines, homo- or copolymers based on allylamine, and homo- or copolymers comprising vinylamine units.

The polyethyleneimines usable advantageously in accordance with the invention are obtainable by polymerizing ethyleneimine in the presence of acids, Lewis acids or compounds which release acids as a catalyst. Such catalysts are, for example, alkyl halides such as methyl chloride, ethyl chloride, propyl chloride, methylene chloride, trichloromethane, carbon tetrachloride or tetrabromomethane. The polyethyleneimines thus prepared have a branched structure with a proportion of primary and tertiary amino groups of approx. 30% each and a proportion of secondary amino groups of approx. 40%. The polyethyleneimines generally have weight-average molecular weights in the range of ≥500 and ≤10 000 000 g/mol, preferably ≥800 and ≤750 000 g/mol and especially of ≥1000 and ≤10 000 g/mol. The preparation of polyethyleneimines by acid-catalyzed conversion of ethyleneimine is disclosed, for example, in U.S. Pat. No. 2,282,306 or U.S. Pat. No. 3,203,910. Other useful compounds comprising ethyleneimine units include polymers obtainable by grafting polyamidoamines with ethyleneimine or by grafting polymers of open-chain N-vinylcarboxamides with ethyleneimine. Grafted polyamidoamines are known, for example, from U.S. Pat. No. 4,144,123.

Typical representatives of polyethyleneimine with branched structure are known by the trade names Epomin® SP-006, Epomin® SP-018 or Epomin® SP-200 from Nippon Shokubai, or Lupasol® FG, Lupasol® G 20, Lupasol® G 35, Lupasol® G 100 and Lupasol® PS from BASF SE.

Homopolymers comprising vinylamine units are obtainable by a two-stage process, by polymerizing N-vinylcarboxamides and hydrolyzing the resulting poly(N-vinylcarboxamides) to form vinylamine units (in this regard, cf., for example, U.S. Pat. No. 4,421,602, U.S. Pat. No. 5,334,287, EP-A 216387, U.S. Pat. No. 5,981,689, WO 00/63295, U.S. Pat. No. 6,121,409 or U.S. Pat. No. 6,132,558). Examples of usable N-vinylcarboxamides are N-vinylformamide, N-vinyl-N-methylformamide, N-vinylacetamide, N-vinyl-N-methylacetamide, N-vinyl-N-ethylacetamide and N-vinylpropionamide. The monomers mentioned can be polymerized alone, in a mixture with one another or together with other monomers to give the corresponding copolymers. A preferred N-vinylcarboxamide is N-vinylformamide.

Useful comonomers include all ethylenically unsaturated compounds copolymerizable with the N-vinylcarboxamides. Examples thereof are vinyl esters of saturated carboxylic acids of 1 to 6 carbon atoms, such as vinyl formate, vinyl acetate, N-vinylpyrrolidone, vinyl propionate and vinyl butyrate, and vinyl ethers such as $C_1$- to $C_6$-alkyl vinyl ethers, e.g. methyl or ethyl vinyl ether. Further suitable comonomers are esters of alcohols having, for example, 1 to 6 carbon atoms, amides and nitriles of ethylenically unsaturated $C_3$- to $C_6$-mono- or $C_4$- to $C_8$-dicarboxylic acids, for example methyl acrylate, methyl methacrylate, ethyl acrylate, ethyl methacrylate and dimethyl maleate, acrylamide and methacrylamide, and acrylonitrile and methacrylonitrile.

Further suitable compounds copolymerizable with N-vinylcarboxamides are carboxylic esters of glycols or and/or polyalkylene glycols off, where only one OH group is esterified in each case, for example hydroxyethyl acrylate, hydroxyethyl methacrylate, hydroxypropyl acrylate, hydroxybutyl acrylate, hydroxypropyl methacrylate, hydroxybutyl methacrylate and acrylic monoesters of polyalkylene glycols of molar mass from 500 to 10 000 g/mol. Further suitable comonomers are esters of ethylenically unsaturated carboxylic acids with amino alcohols, for example dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminobutyl acrylate and diethylaminobutyl acrylate.

The basic acrylates can be used in the form of the free bases, of the salts with mineral acids such as hydrochloric acid, sulfuric acid or nitric acid, of the salts with organic acids such as formic acid, acetic acid, propionic acid, or of the sulfonic acids, or in quaternized form. Suitable quaternizing agents are, for example, dimethyl sulfate, diethyl sulfate, methyl chloride, ethyl chloride or benzyl chloride. Further suitable comonomers are amides of ethylenically unsaturated carboxylic acids, such as acrylamide, methacrylamide, and N-alkyl mono- and diamides of monoethylenically unsaturated carboxylic acids with alkyl radicals from 1 to 6 carbon atoms, e.g. N-methylacrylamide, N,N-dimethylacrylamide, N-methylmethacrylamide, N-ethylacrylamide, N-propylacrylamide and tert-butylacrylamide, and basic (meth)acrylamides, such as, for example, dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Also suitable as comonomers are N-vinylpyrrolidone, N-vinylcaprolactam, acrylonitrile, methacrylonitrile, N-vinylimidazole and substituted N-vinylimidazoles, for example N-vinyl-2-methylimidazole, N-vinyl-4-methylimidazole, N-vinyl-5-methylimidazole, N-vinyl-2-ethylimidazole and N-vinylimidazolines, such as N-vinylimidazoline, N-vinyl-2-methylimidazoline and N-vinyl-2-ethylimidazoline. N-Vinylimidazoles and N-vinylimidazolines are used not only in the form of the free bases but also in a form neutralized with mineral acids or organic acids or in quaternized form, the quaternization preferably being carried out with dimethyl sulfate, diethyl sulfate, methyl chloride or benzyl chloride. Also useful are diallyldialkylammonium halides, for example diallyldimethylammonium chloride.

The copolymers advantageously comprise
  95 to 5 mol %, preferably 90 to 10 mol %, of at least one N-vinylcarboxamide, preferably N-vinylformamide, and
  5 to 95 mol %, preferably 10 to 90 mol %, of at least one monoethylenically unsaturated comonomer,
in copolymerized form. The comonomers are preferably free of acid groups.

The polymerization of the aforementioned monomers is typically performed in the presence of free radical-forming polymerization initiators. The homo- and copolymers can be obtained by all known processes; for example, they are obtained by solution polymerization in water, alcohols, ethers or dimethylformamide or in mixtures of various solvents, by precipitation polymerization, inverse suspension polymerization (polymerizing an emulsion of a monomer-containing aqueous phase in an oil phase) and polymerizing a water-in-water emulsion, for example in which an aqueous monomer solution is dissolved or emulsified in an aqueous phase and polymerized to form an aqueous dispersion of a water-soluble polymer, as described, for example, in WO 00/27893. After the polymerization, the homo- and copolymers comprising polymerized N-vinylcarboxamide units are partially or fully hydrolyzed as described below.

In order to prepare polymers comprising vinylamine units, the starting materials are preferably homopolymers of N-vinylformamide or copolymers obtainable by copolymerizing
  N-vinylformamide with
  vinyl formate, vinyl acetate, vinyl propionate, acrylonitrile, methyl acrylate, ethyl acrylate and/or methyl methacrylate
and then hydrolyzing the homo- or copolymers to form vinylamine units from the polymerized N-vinylformamide units, the hydrolysis level being generally ≥1 and ≤100 mol %, preferably ≥25 and ≤100 mol %, more preferably ≥50 and ≤100 mol % and especially preferably ≥70 and ≤100 mol %, based in each case on the original content of unhydrolyzed N-vinylcarboxamide groups. The hydrolysis level in the homopolymers corresponds to the content of vinylamine groups in mol %. The above-described polymers are hydrolyzed by known processes, by the action of acids (for example mineral acids such as sulfuric acid, hydrochloric acid or phosphoric acid, carboxylic acids such as formic acid or acetic acid, or sulfonic acids or phosphonic acids), bases or enzymes, as described, for example, in DE-A 3128478 and U.S. Pat. No. 6,132,558. When acids are used as hydrolyzing agents, the vinylamine units of the polymers are present as the ammonium salt, whereas hydrolysis with bases gives rise to the free amino groups.

The hydrolysis levels of the homo- and copolymers used is preferably ≥85 mol %, advantageously ≥95 mol % and more preferably 100 mol %. In the case of copolymers comprising vinyl esters in copolymerized form, not only the hydrolysis of the N-vinylformamide units but also hydrolysis of the ester groups to form vinyl alcohol units can occur. This is the case especially when the hydrolysis of the copolymers is performed in the presence of sodium hydroxide solution. Copolymerized acrylonitrile is likewise chemically altered in the hydrolysis. This gives rise, for example, to amide groups or carboxyl groups. The homo- and copolymers comprising vinylamine units may optionally comprise up to 20 mol % of amidine units, which results, for example, from reaction of formic acid with two adjacent amino groups or from intramolecular reaction of one amino group with an adjacent amide group, for example of polymerized N-vinylformamide.

The weight-average molecular weights of the homo- or copolymers comprising vinylamine units are ≥500 and ≤10 000 000 g/mol, preferably ≥1000 and ≤5 500 000 g/mol and more preferably ≥5000 and ≤400 000 g/mol. These molecular weight ranges correspond, in the case of the homopolymers, to K values in the range from 30 to 250, preferably 60 to 100 (determined according to H. Fikentscher in 5% by weight aqueous sodium chloride solution at 25° C., a pH of 7 and a polymer concentration of 0.5% by weight).

The homo- or copolymers comprising vinylamine units can be used either in salt-containing form (corresponding to the hydrolysis mixture obtained) or in salt-free form. Salt-free aqueous solutions of homo- or copolymers comprising vinylamine units can be prepared, for example, from the above-described salt-containing hydrolysis mixture with the aid of an ultrafiltration using suitable membranes with separation limits of, for example, 1000 to 500 000 daltons, preferably 10 000 to 300 000 daltons.

For reasons of cost, and generally without significant losses in terms of the mechanical properties of the shaped articles, the homo- or copolymers comprising vinylamine units are frequently used in the salt-containing form thereof (i.e. the mixtures which result from the hydrolysis of the corresponding homo- or copolymers comprising N-vinylcarboxamides and have not been worked up any further).

The polymers comprising vinylamine units also include hydrolyzed graft polymers of, for example, N-vinylformamide onto polyalkylene glycols, polyvinyl acetate, polyvinyl alcohol, polyvinylformamides, polysaccharides such as starch, oligosaccharides or monosaccharides. The graft polymers are obtainable by, for example, free-radically polymerizing N-vinylformamide in an aqueous medium in the presence of at least one of the specified graft bases, optionally together with other copolymerizable monomers, and then hydrolyzing the grafted-on vinylformamide units to vinylamine units in a known manner.

Typical representatives of the homopolymers comprising vinylamine units are known by the trade names Catiofast® VFH, Catiofast® VSH and Catiofast® VMP, and Lupamin® 5095, Lupamin® 9095 and Lupamin® 1595 from BASF SE.

The preparation of the homo- or copolymers which are based on allylamine and are likewise usable in accordance with the invention as polyamine A by free-radical polymerization of allylammonium compounds is disclosed, for example, in EP-A 95233.

Particularly advantageously, the polyamines A have more than 2 primary amino groups, for example ≥3, ≥4, ≥5, ≥6, ≥7, ≥8, ≥9 or even ≥10 primary amino groups, per mole, especially ≥5 or especially advantageously even ≥10 primary amino groups per mole.

Of course, the polyamines A also include monosaccharide, oligosaccharide and/or polysaccharide compounds having ≥2 primary amino groups per mole.

It is advantageous in accordance with the invention to use polyamines A which have, at 20° C. and 1 atm (=1.013 bar absolute=atmospheric pressure), a solubility of ≥5 g, particularly advantageously ≥10 g and especially advantageously ≥20 g per 100 g of deionized water.

It is of course also possible in accordance with the invention to use mixtures of various polyamines A.

A preferred polyamine A is a homopolymer, comprising vinylamine units, of a vinylcarboxamide, preferably vinylformamide, with a hydrolysis level of ≥50 mol %, preferably 85 mol % and especially preferably 100 mol %, and/or a polyethyleneimine with branched structure.

An essential constituent of the inventive aqueous binder composition, as well as at least one polyamine A, is at least one saccharide compound S.

In the context of this document, a saccharide compound S is understood to mean monosaccharides, oligosaccharides and/or polysaccharides, and also substitution products and derivatives of the aforementioned compounds.

The monosaccharides are organic compounds of the general formula $C_nH_{2n}O_n$ where n is an integer of 5, 6, 7, 8 or 9. These monosaccharides are also referred to as pentoses, hexoses, heptoses, octoses or nonoses, and these compounds can be subdivided into the corresponding aldoses which have an aldehyde group, and ketoses which have a keto group. Accordingly, the monosaccharides comprise aldo- or keto-pentoses, -hexoses, -heptoses, -octoses or -nonoses. Monosaccharide compounds preferred in accordance with the invention are the pentoses and hexoses which also occur in nature, special preference being given to glucose, mannose, galactose and/or xylose. It will be appreciated that the invention also comprises all stereoisomers of all aforementioned monosaccharides.

It is known that the aforementioned monosaccharides are present in the form of the hemiacetals or -ketals thereof, formed from one hydroxyl group and the aldehyde or keto group, generally forming a five- or six-membered ring. If a hydroxyl group (from the hemiacetal or hemiketal group or from the carbon skeleton chain) of one monosaccharide molecule then reacts with the hemiacetal or hemiketal group of another monosaccharide molecule with elimination of water to form an acetal or ketal group (such a bond is also called a glycosidic bond), this affords disaccharides (with the general empirical formula $C_nH_{2n-2}O_{n-1}$). In addition, such a disaccharide can react with a further monosaccharide with elimination of water to give a trisaccharide. Further reactions with monosaccharides afford tetrasaccharides, pentasaccharides, hexasaccharides, heptasaccharides, octasaccharides, nonasaccharides or decasaccharides. Compounds formed from at least two but not more than ten monosaccharide structural units via glycosidic bonds are referred to as oligosaccharides. Preferred oligosaccharides are the disaccharides, among which particular preference is given to lactose, maltose and/or sucrose. It will be appreciated that the invention shall also comprise all stereoisomers of all aforementioned oligosaccharides.

Saccharide compounds formed from more than ten monosaccharide structural units are referred to in the context of this document as polysaccharide compounds. The polysaccharide compounds may be formed from the structural elements of a monosaccharide (called homoglycans) or the structural elements of two or more different monosaccharides (called heteroglycans). Preference is given in accordance with the invention to using homoglycans.

Among the homoglycans, special preference is given to the starches formed from α-D-glucose units. The starches consist of the polysaccharides amylose (D-glucose units α-1,4-glycosidically bonded to one another) and amylopectin (D-glucose units α-1,4- and additionally about 4% α-1,6-glycosidically bonded to one another). Typically, naturally occurring starch comprises about 20 to 30% by weight of amylose and about 70 to 80% by weight of amylopectin. By breeding, and varying according to the plant type, the ratio between amylose and amylopectin may, however, be altered. Suitable starches are all native starches, for example starches from corn, wheat, oats, barley, rice, millet, potatoes, peas, tapioca or sago. Also of interest are those natural starches which have a high amylopectin content, such as waxy corn starch and waxy potato starch. The amylopectin content of these starches is 90% by weight, often ≥95% and ≤100% by weight.

It will be appreciated that the term "saccharide compound S" also comprises the substitution products and derivatives of the aforementioned mono-, oligo- and polysaccharide compounds, although saccharide compounds having ≥2 primary amino groups are to be excluded.

The substitution products of a saccharide compound S are understood to mean those in which at least one hydroxyl group of the saccharide compound S has been functionalized with retention of the saccharide structure, for example by esterification, etherification, oxidation, etc. The esterification is effected, for example, by reaction of the saccharide compound S with inorganic or organic acids, or the anhydrides or halides thereof. Of particular interest are phosphated and acetylated saccharide compounds. The etherification is effected generally by reaction of the saccharide compounds with organic halogen compounds, epoxides or sulfates in aqueous alkaline solution. Known ethers are alkyl ethers, hydroxyalkyl ethers, carboxyalkyl ethers and allyl ethers. The oxidation of at least one hydroxyl group by means of an oxidizing agent customary in organic carbohydrate chemistry, for example nitric acid, hydrogen peroxide, ammonium persulfate, peroxyacetic acid, sodium hypochlorite and/or 2,2,6,6-tetramethyl-1-piperidinyloxy (TEMPO) gives rise to the corresponding keto compound (in the case of oxidation of a secondary hydroxyl group), or carboxyl compound (in the case of oxidation of a primary hydroxyl group).

Derivatives of saccharide compounds S are understood to mean those reaction products of oligo- and polysaccharides which are obtained with cleavage of at least one acetal or ketal group (i.e. of at least one glycosidic bond) and therefore with degradation of the original saccharide structure. Such degradation reactions are familiar to those skilled in the art and are effected, more particularly, by subjecting an oligo- or polysaccharide compound to thermal, enzymatic, oxidative and/or hydrolytic conditions.

Advantageously, the saccharide compounds S used are starch, cellulose, guaran, xanthan, alginate, pectin, chitosan, gum arabic, carrageenan, agar and/or gellan and substitution products or derivatives thereof.

It is particularly advantageous, however, to use starches and/or starch derivatives or substitution products thereof, special preference being given to maltodextrin and/or glucose syrup.

A very familiar parameter in commercial practice for characterization of the degradation level of starches is the DE value. DE stands for Dextrose Equivalent, and refers to the percentage of reducing sugars in the dry substance. The DE value therefore corresponds to the amount of glucose (=dextrose) in grams which would have the same reduction capacity per 100 g of dry substance. The DE value is a measure of the extent of polymer degradation. Therefore, starches with low DE value maintain a high proportion of polysaccharides and a low content of low molecular weight mono- and oligosaccharides, while starches with a high DE value consist principally of low molecular weight mono- or disaccharides. The maltodextrins preferred in the context of the present invention have DE values in the range from 3 to 30 and weight-average molecular weights of 15 000 to 30 000 g/mol. A glucose syrup likewise preferred in the context of the present invention has DE values of 20 to 35. By virtue of their preparation, these products are obtained in the form of aqueous solutions and are therefore generally also traded as such. Suitable solutions of maltodextrins have solids contents of 50 to 70% by weight; suitable solutions of glucose syrup have solids contents of 70 to 95% by weight. Maltodextrins in particular, however, are also available in spray-dried form as powders. Also preferred in accordance with the invention are modified degraded starches which have DE values of 1 to 3 and weight-average molecular weights Mw of 100 000 to 1 000 000 g/mol, and are typically obtainable as solids.

The saccharide compound S generally has a molecular weight (in the case of mono-, di- or trisaccharides) or weight-average molecular weight (in the case of higher oligo- and polysaccharides) in the range of ≥150 and ≤5 000 000 g/mol, often in the range of ≥180 and ≤100 000 g/mol and frequently in the range of ≥180 and ≤30 000 g/mol.

It is preferable when the saccharide compound S used in accordance with the invention has a solubility of ≥10 g, advantageously ≥50 g and especially advantageously ≥100 g per liter of deionized water at 20° C. and atmospheric pressure. The invention, however, shall also comprise embodiments where the saccharide compound S has a solubility of <10 g per liter of deionized water at 20° C. and atmospheric pressure. Depending on the amount of these saccharide compounds S used, they may then also be present in the form of aqueous suspensions thereof. When saccharide compounds S, in terms of nature and amount, are used in accordance with the invention such that they are present in aqueous suspension, it is advantageous when the particles of the saccharide compound S suspended in aqueous medium have a mean particle diameter of ≤5 μm, preferably ≤3 μm and especially preferably ≤1 μm. As in the case of the aqueous polymer P dispersions, the mean particle diameters are determined via the method of quasielastic light scattering (ISO Standard 13 321).

Advantageously in accordance with the invention, the saccharide compound S used is glucose, mannose, galactose, xylose, fructose, ribose, lactose, maltose, sucrose, maltodextrin and/or glucose syrup, but particular preference is given to glucose, fructose, maltose, maltodextrin and/or glucose syrup and especially to glucose and/or glucose syrup.

It is of course also possible in accordance with the invention to use mixtures of various saccharide compounds S.

In the inventive aqueous binder, the weight ratio of the at least one polyamine A to the at least one saccharide compound S is 1:99 to 80:20, advantageously 5:95 to 50:50 and especially advantageously 10:90 to 35:65.

The inventive aqueous binder is produced by mixing the at least one polyamine A and the at least one saccharide compound S in an aqueous medium with one another at 20 to 25° C. (room temperature) or at higher temperature. The sequence of additions is generally unimportant.

The resulting aqueous binders generally have a solids content in the range of $\geq 1$ and $\leq 70\%$ by weight, based on the sum of the total amounts of polyamine A and saccharide compound S. When the inventive binders are used for binding of cork particles, the solids content thereof is advantageously $\geq 30$ and $\leq 70\%$ by weight and especially advantageously $\geq 50$ and $\leq 65\%$ by weight. If the inventive binders, however, are used to bind glass fibers or glass fiber webs, the solids content thereof is advantageously $\geq 5$ and $\leq 40\%$ by weight and especially advantageously $\geq 10$ and $\leq 30\%$ by weight, while the inventive binders for binding of glass wool or rock wool advantageously have a solids content of $\geq 1$ and $\leq 15\%$ by weight and especially advantageously $\geq 2$ and $\leq 8\%$ by weight, the solids contents being based in each case on the sum of the total amounts of polyamine A and saccharide compound S.

The inventive aqueous binders also generally have a pH in the range of $\geq 4$ and $\leq 12$, advantageously $\geq 5$ and $\leq 12$ and especially advantageously $\geq 6$ and $\leq 11$. The pH is measured at room temperature with a 5% by weight (based on the sum of the total amounts of polyamine A and saccharide compound S) aqueous binder with a calibrated pH meter. The adjustment of the pH values is familiar to those skilled in the art and is effected by means of inorganic or organic acids and bases such as, more particularly, dilute sulfuric acid or aqueous sodium hydroxide or potassium hydroxide solution.

It is also essential that the inventive aqueous binder may comprise, as well as the polyamine A and the saccharide compound S, as essential components, optionally further components familiar to the person skilled in the art in terms of type and amount, for example thickeners, pigment distributors, dispersants, emulsifiers, adhesion promoters, humectants (for example glycerol), buffer substances, neutralizing agents, biocides, defoamers or organic solvents.

It is, however, advantageous when the total amount of organic compounds present alongside the polyamine A and the saccharide compound S in the aqueous binder is $\leq 30\%$ by weight, preferably $\leq 10\%$ by weight and especially advantageously $\leq 5\%$ by weight, based in each case on the sum of the total amounts of polyamine A and saccharide compound S, although the organic by-products obtained in the preparation of the homo- and copolymers comprising vinylamine units by hydrolysis of the corresponding vinylcarboxylic acid units (direct hydrolysis products), for example alkali metal formates or alkali metal acetates are not to be included in the amounts stated above.

The inventive aqueous binder is advantageously suitable for use as a binder for granular and/or fibrous substrates. Advantageously, said aqueous binder can therefore be used in the production of shaped articles from granular and/or fibrous substrates.

Granular and/or fibrous substrates are familiar to those skilled in the art. For example, these are woodchips, wood fibers, cellulose fibers, textile fibers, synthetic fibers, mineral fibers such as glass fibers, glass wool or rock wool, or natural fibers such as jute, flax, hemp or sisal, but also cork particles or sand and other organic or inorganic, natural and/or synthetic, granular and/or fibrous compounds, the longest dimension of which, in the case of granular substrates, is $\leq 10$ mm, preferably $\leq 5$ mm and especially $\leq 2$ mm. It will be appreciated that the term "substrate" shall also comprise the fiber webs obtainable from fibers, for example what are called mechanically consolidated fiber webs, for example needled or chemically prebonded fiber webs. The inventive aqueous binder is especially advantageously suitable as a formaldehyde-free binder for the aforementioned mineral fibers, especially glass fibers, mechanically consolidated or chemically prebonded glass fiber webs, and also for cork particles.

The process for producing a shaped article from a granular and/or fibrous substrate and the aforementioned aqueous binder is advantageously effected in such a way that the inventive aqueous binder is applied to a granular and/or fibrous substrate (impregnation), the granular and/or fibrous substrate treated (impregnated) with the aqueous binder composition is optionally shaped, and the granular and/or fibrous substrate thus obtained is then subjected to a thermal treatment step at a temperature of $\geq 110°$ C., advantageously $\geq 150°$ C. and especially advantageously $\geq 170°$ C. and $\leq 250°$ C., advantageously $\leq 220°$ C., in the course of which the polyamine A and the saccharide compound S react with one another with elimination of water and curing.

It is important that the essential components of the inventive aqueous binder, i.e. the polyamine A and the saccharide compound S, can be mixed homogeneously, more particularly in the form of aqueous solutions or suspensions thereof, prior to application to the granular and/or fibrous substrate. However, it is also possible not to mix these two components until immediately prior to application, for example with a static and/or dynamic mixing device. It will be appreciated that it is also possible first to apply an aqueous solution or suspension of the polyamine A and then the aqueous solution or suspension of the saccharide compound S to the granular and/or fibrous substrate, in which case the mixing proceeds on the granular and/or fibrous substrate. In an analogous manner, however, it is also possible first to apply the aqueous solution or suspension of the saccharide compound S and then the aqueous solution or suspension of the polyamine A to the granular and/or fibrous substrate. It will be appreciated that mixed forms of the application of the two essential components shall also be encompassed by the invention.

The granular and/or fibrous substrate is generally impregnated by homogeneous application of the aqueous binder agent to the surface of the fibrous and/or granular substrate. The amount of aqueous binder is selected such that $\geq 1$ and $\leq 100$ g, preferably $\geq 2$ and $\leq 50$ g and especially preferably $\geq 3$ and $\leq 30$ g of binder (calculated as the sum of the total amounts of polyamine A and saccharide compound S based on solids) are used per 100 g of granular and/or fibrous substrate. The impregnation of the granular and/or fibrous substrate is familiar to those skilled in the art and is effected, for example, by soaking or by spraying the granular and/or fibrous substrate with the inventive aqueous binder.

After the impregnation, the granular and/or fibrous substrate is optionally shaped as desired, for example by introduction into a heatable press or mold. Thereafter, the shaped impregnated granular and/or fibrous substrate is dried in a manner familiar to those skilled in the art and cured with elimination and removal of water.

Frequently, the optionally shaped, impregnated granular and/or fibrous substrate is dried and cured in two temperature stages, in which case the drying stage is effected at a temperature of $<100°$ C., preferably $\geq 20$ and $\leq 90°$ C. and especially preferably $\geq 40$ and $\leq 80°$ C., and the curing stage at a temperature of $\geq 110°$ C., preferably $\geq 150$ and $\leq 250°$ C. and especially preferably ≥170 and ≤220° C. After the drying stage, the impregnated granular and/or fibrous substrate is still thermoplastic and, when heated to a temperature of ≥50 and ≤100° C., is still deformable. After the curing stage with elimination and removal of water, the treated granular and/or fibrous substrate generally has thermoset characteristics.

It will be appreciated that it is also possible that the drying stage and the curing stage of the shaped articles are effected in one operating step, for example in a mold press.

For the process according to the invention, the granular and/or fibrous fibers are advantageously mineral fibers, especially glass fibers or glass fiber webs, and also cork particles.

The shaped articles obtainable by the process according to the invention have advantageous properties, more particularly improved wet tear strength and/or improved water resistance. In addition, in the case of use of the inventive aqueous binder for binding of glass fibers, glass fiber webs, glass wool or rock wool, it is possible to dispense with the otherwise customary adhesion promoters, for example silane or siloxane compounds, without any losses in terms of the mechanical properties of the shaped articles obtained.

EXAMPLES

I. Production of the Binder Liquors

Feedstocks:

Polyamine 1 (P1): aqueous solution of polyvinylamine, Mw: 330 000 g/mol, hydrolysis level 100%, polymer solids content: 9% by weight Polyamine 2 (P2): aqueous solution of polyvinylamine, Mw: 48 000 g/mol, hydrolysis level 100%, polymer solids content: 10% by weight Polyamine 3 (P3): aqueous solution of polyvinylamine, Mw: 1200 g/mol, hydrolysis level 100%, polymer solids content: 10% by weight Polyamine 4 (P4): hexamethylenediamine, ≥99% by weight, Merck Schuchardt OHG Polyamine 5 (P5): polyethyleneimine, Mw: 800 g/mol, charge density: 16 meq/g, 99% by weight Polyamine 6 (P6): aqueous solution of polyethyleneimine, Mw: 1300 g/mol, charge density: 16 meq/g, polymer solids content: 50% by weight Polyamine 7 (P7): aqueous solution of polyethyleneimine, Mw: 2000 g/mol, charge density: 16 meq/g, polymer solids content: 50% by weight Polyamine 8 (P8): aqueous solution of polyethyleneimine, Mw: 5000 g/mol, charge density: 17 meq/g, polymer solids content: 50% by weight Polyamine 9 (P9): aqueous solution of polyethyleneimine, Mw: 750 000 g/mol, charge density: 20 meq/g, polymer solids content: 33% by weight Saccharide compound 1 (S1): 72% by weight aqueous solution of a hydrolytically degraded starch with a DE value of 26 to 32 (C*Sweet 01403 from Cargill GmbH)

Saccharide compound 2 (S2): 50% by weight aqueous solution of glucose monohydrate (glucose monohydrate from Sigma Aldrich Chemie GmbH)

Saccharide compound 3 (S3): fructose monohydrate 99% by weight, Sigma Aldrich Chemie GmbH Saccharide compound 4 (S4): maltose monohydrate 98% by weight, Sigma Aldrich Chemie GmbH Saccharide compound 5 (S5): 50% by weight aqueous solution of a hydrolytically degraded starch with a DE value of 28 (Maltosweet® 300, from Tate and Lyle GmbH)

Comparative binder C: Acrodur® DS 3530 from BASF SE (50% by weight aqueous solution of a mixture consisting of acrylic acid/maleic acid copolymer and triethanolamine)

Production of the Aqueous Binder Liquors

For production of the aqueous binder liquors, at 20 to 25° C. (room temperature), in each case 100 g of deionized water and the amounts of the respective polyamines P1 to P9 specified in table 1 formed an initial charge in a 5 l beaker, and then the amounts of the respective saccharide compounds S1 to S5, likewise specified in table 1, were added while stirring. To these solutions was added 0.3 g of 3-aminopropyltriethoxysilane (Silquest® A-1100 Silane from Momentive Performance Materials), and the mixture was mixed homogeneously by stirring for 10 minutes. Subsequently, the respective solutions were diluted to a polymer solids content of 5% by weight by adding deionized water. The resulting solutions are referred to as binder liquors A1 to A23. In the case of binder liquors A11 and A13, a pH of 4 was established by adding 50% by weight aqueous sulfuric acid solution and, in the case of binder liquors A12 and A14, a pH of 11 was established by adding 50% by weight aqueous sodium hydroxide solution.

Comparative liquors C1 to C3 were obtained by initially charging 180.0 g of the comparative binder C in a 5 l beaker and then adding 0.3 g of 3-aminopropyltriethoxysilane and mixing homogeneously by stirring for 10 minutes. Subsequently, the respective solutions were diluted to a polymer solids content of 5% by weight by adding deionized water. In the case of comparative liquor C2, a pH of 4 was established by adding 50% by weight aqueous sulfuric acid solution and, in the case of comparative liquor C3, a pH of 11 was established by adding 50% by weight aqueous sodium hydroxide solution.

TABLE 1

Composition of the binder liquors

| Binder liquor | Polyamine | Saccharide | |
|---|---|---|---|
| A1 | 100.0 g P1 | 112.5 g S1 | |
| A2 | 200.0 g P1 | 100.0 g S1 | |
| A3 | 400.0 g P1 | 50.0 g S1 | |
| A4 | 200.0 g P1 | 144.0 g S2 | |
| A5 | 200.0 g P1 | 73.0 g S3 | |
| A6 | 200.0 g P1 | 73.0 g S4 | |
| A7 | 200.0 g P1 | 144.0 g S5 | |
| A8 | 200.0 g P2 | 111.1 g S1 | |
| A9 | 200.0 g P3 | 111.1 g S1 | |
| A10 | 40.0 g P4 | 88.9 g S1 | |
| A11 | 100.0 g P1 | 112.5 g S1 | (pH 4) |
| A12 | 100.0 g P1 | 112.5 g S1 | (pH 11) |
| A13 | 200.0 g P1 | 100.0 g S1 | (pH 4) |
| A14 | 200.0 g P1 | 100.0 g S1 | (pH 11) |
| A15 | 18.2 g P5 | 100.0 g S1 | |
| A16 | 36.0 g P6 | 100.0 g S1 | |
| A17 | 36.0 g P7 | 100.0 g S1 | |
| A18 | 36.0 g P8 | 100.0 g S1 | |
| A19 | 54.5 g P9 | 100.0 g S1 | |
| A20 | 63.0 g P8 | 81.3 g S1 | |
| A21 | 18.0 g P8 | 162.0 g S2 | |
| A22 | 36.0 g P8 | 144.0 g S2 | |
| A23 | 63.0 g P8 | 117.0 g S2 | |

II. Performance Tests

The shaped articles were produced using micro glass fiber webs (27 cm×28.5 cm) from Whatman, GF/A No. 1820-915 type with a basis weight of 54 g/m².

Production of the Test Strips

To apply the binder liquors (impregnation), the glass fiber webs were each passed through the aforementioned 5% by weight aqueous binder liquors A1 to A23 and C1 to C3 in longitudinal direction by means of a continuous PES sieve belt with a belt speed of 60 cm per minute. By subsequent absorption of the aqueous binder liquors, the wet application was adjusted to 216 g/m² (corresponding to 10.8 g/m² of binder, calculated as solids). The impregnated glass fiber webs thus obtained were dried and cured in a Mathis oven on a plastic mesh as a support at 180° C. or at 200° C. with maximum hot air flow for 3 minutes. After cooling to room temperature, test strips with a size of 240×50 mm were punched out in longitudinal fiber direction. The resulting test strips were subsequently stored under controlled climatic conditions of 23° C. and 50% relative air humidity for 24 hours. The glass fiber web test strips obtained according to the binder liquors A1 to A23 and C1 to C3 used are referred to hereinafter as test strips A1 to A23 and C1 to C3.

Determination of the "Dry" Tear Strength at Room Temperature (=DTS)

The tear strength at room temperature was determined on a Zwick-Roell Z005 tensile tester. The test strips A1 to A23 and C1 to C3 were introduced vertically a clamp device such that the free clamped length was 200 mm. Thereafter, the clamped test strips were pulled in opposite directions at a rate of 25 mm per minute until the test strips tore. The higher the force required to tear the test strips, the better the assessment of the corresponding tear strength. 5 separate measurements were effected in each case. The DTS values reported in table 2 are each the mean of these measurements.

Determination of the "Wet" Tear Strength at 80° C. (=WTS)

To determine the wet tear strength, the test strips A1 to A23 and C1 to C3 were stored in deionized water at 80° C. for 15 minutes and then excess water was dabbed off with a cotton fabric. The wet tear strength was determined on a Zwick-Roell Z005 tensile tester. The test strips A1 to A23 and C1 to C3 were introduced vertically a clamp device such that the free clamped length was 160 mm. Thereafter, the clamped test strips were pulled in opposite directions at a rate of 25 mm per minute until the test strips tore. The higher the force required to tear the test strips, the better the assessment of the corresponding wet tear strength. 5 separate measurements were effected in each case. The WTS values reported in table 2 are each the mean of these measurements.

Determination of the Tear Strength at 180° C. (=Hot Tear Strength; HTS)

The tear strength at 180° C. was determined in the Zwick-Roell Z 010 TH2 A tensile tester. The test strips A1 to A23 and C1 to C3 were introduced vertically into a clamp device such that the free clamped length was 240 mm. The tear strength was determined by first heating the test strips A1 to A23 and C1 to C3 at 180° C. for 60 seconds and then pulling them at this temperature in opposite directions at a speed of 25 mm per minute until the test strips tore. 5 measurements were effected in each case. The HTS values likewise reported in table 2 are each the mean of these measurements.

TABLE 2

Summary of the tear strength results [values each stated in N/50 mm]

| Test strip | DTS 180° C. | DTS 200° C. | WTS 180° C. | WTS 200° C. | HTS 180° C. | HTS 200° C. |
|---|---|---|---|---|---|---|
| C1 | 109 | 99 | 60 | 90 | 104 | 104 |
| C2 | 103 | 97 | 32 | 54 | 101 | 103 |
| C3 | 40 | 31 | 3 | 4 | 71 | 75 |
| A1 | 100 | 103 | 37 | 40 | 97 | 109 |
| A2 | 108 | 98 | 57 | 60 | 103 | 99 |
| A3 | 106 | 112 | 62 | — | 111 | 100 |
| A4 | 98 | 90 | 70 | — | 101 | 92 |
| A5 | 90 | 91 | 64 | — | 97 | 93 |
| A6 | 92 | 91 | 70 | — | 103 | 102 |
| A7 | 91 | 97 | 53 | — | 100 | 102 |
| A8 | 98 | 101 | 64 | 73 | 104 | 112 |
| A9 | 86 | 93 | 46 | 56 | 94 | 101 |
| A10 | 92 | — | 31 | — | 80 | — |
| A11 | — | — | 37 | 41 | — | — |
| A12 | — | — | 45 | 47 | — | — |
| A13 | — | — | 56 | 61 | — | — |
| A14 | — | — | 62 | 68 | — | — |
| A15 | — | 108 | — | — | — | 106 |
| A16 | — | 104 | — | — | — | 106 |
| A17 | — | 107 | 62 | — | — | 98 |
| A18 | 98 | 99 | 47 | 54 | 95 | 98 |
| A19 | — | 97 | — | — | — | 93 |
| A20 | 101 | 104 | 57 | 59 | 97 | 93 |
| A21 | — | 112 | — | 71 | — | 102 |
| A22 | 115 | 112 | 73 | 79 | 106 | 105 |
| A23 | 119 | 110 | 74 | 78 | 101 | 107 |

It is clearly evident from the results that the inventive aqueous binders have tear strength results similar to or better than the prior art binder systems.

The invention claimed is:

1. An aqueous binder comprising, as active constituents:
   a) polyamine A, which is at least one organic compound having at least two primary amino groups, wherein the polyamine A is a homopolymer, comprising vinylamine units, of a vinylcarboxamide with a hydrolysis level of ≥50 mol %, and
   b) a saccharide compound S,
   wherein the weight ratio of the polyamine A to the saccharide compound S is 10:90 to 80:20.

2. The aqueous binder according to claim 1,
   wherein the saccharide compound S comprises a monosaccharide, an oligosaccharide and/or a polysaccharide, or a substitution product or a derivative thereof.

3. The aqueous binder according to claim 1,
   wherein the saccharide compound S comprises glucose, mannose, galactose, xylose, fructose, ribose, lactose, maltose, sucrose, maltodextrin and/or glucose syrup.

4. The aqueous binder according to claim 1,
   wherein the polyamine A has a molecular weight of ≥60 and ≤10 000 000 g/mol.

5. The aqueous binder according to claim 1,
   wherein the polyamine A has ≥5 primary amino groups per mole.

6. The aqueous binder according to claim 1,
   wherein the weight ratio of the polyamine A to the saccharide compound S is 5:95 to 50:50.

7. The aqueous binder according to claim 1, further comprising at least one additional organic compound, wherein the total amount of additional organic compound(s) is ≤30% by weight, based on the sum of the weights of polyamine A and saccharide compound S.

8. The aqueous binder according to claim 1,
   wherein the pH of the aqueous binder is in the range of ≥6 and ≤11.

9. The aqueous binder according to claim 1,
   wherein solids content in the aqueous binder is ≥1 and ≤70% by weight, based on the sum of the weights of polyamine A and saccharide compound S.

10. A process for producing a shaped article from a granular and/or fibrous substrate, the process comprising:
applying the aqueous binder according to claim 1 to the granular and/or fibrous substrate,
optionally shaping the granular and/or fibrous substrate treated with the aqueous binder and
subjecting the granular and/or fibrous substrate to a thermal treatment at a temperature of $\geq 110°$ C.

11. The process according to claim 10,
wherein $\geq 1$ and $\leq 100$ g of binder are used per 100 g of granular and/or fibrous substrate.

12. The process according to claim 10,
wherein the granular and/or fibrous substrate comprises mineral fibers or cork particles.

13. A shaped article obtained by the process according to claim 10.

14. The aqueous binder according to claim 1,
wherein the weight ratio of the polyamine A to the saccharide compound S is 10:90 to 35:65.

15. The aqueous binder according to claim 3,
wherein the weight ratio of the polyamine A to the saccharide compound S is 10:90 to 35:65.

16. The aqueous binder according to claim 7,
wherein the weight ratio of the polyamine A to the saccharide compound S is 10:90 to 35:65.

17. The aqueous binder according to claim 8,
wherein the weight ratio of the polyamine A to the saccharide compound S is 10:90 to 35:65.

\* \* \* \* \*